(12) United States Patent
Bertolini et al.

(10) Patent No.: US 12,723,625 B2
(45) Date of Patent: Sep. 1, 2026

(54) BEARING UNIT

(71) Applicant: Aktiebolaget SKF, Gothenburg (SE)

(72) Inventors: Andrea A. Bertolini, Carrara (IT); Pasquale Frezza, Aversa (IT); Renato Berti, Massa (IT)

(73) Assignee: Aktiebolaget, SKF, Gothenburg (SE)

( * ) Notice: Subject to any disclaimer, the term of this patent is extended or adjusted under 35 U.S.C. 154(b) by 138 days.

(21) Appl. No.: 18/430,770

(22) Filed: Feb. 2, 2024

(65) Prior Publication Data

US 2024/0271664 A1 Aug. 15, 2024

(30) Foreign Application Priority Data

Feb. 10, 2023 (IT) ........................ 102023000002274

(51) Int. Cl.
*F16C 33/80* (2006.01)
*F16C 33/78* (2006.01)

(52) U.S. Cl.
CPC .......... *F16C 33/80* (2013.01); *F16C 33/7863* (2013.01)

(58) Field of Classification Search
CPC .............. F16C 33/7859; F16C 33/7863; F16C 33/7896; F16C 33/80; F16C 33/805
See application file for complete search history.

(56) References Cited

U.S. PATENT DOCUMENTS 2,917,328 A * 12/1959 Peterson ............. F16C 33/7859 277/420
2,945,730 A * 7/1960 Murray ............... F16C 33/6674 277/420
3,550,974 A * 12/1970 Kupchick ........... F16C 33/7863 384/480
4,379,600 A * 4/1983 Muller .................... F16C 33/80 384/480

(Continued)

FOREIGN PATENT DOCUMENTS

DE 278387 A1 * 5/1990 .......... F16C 33/7859
DE 102022206417 A1 1/2023

(Continued)

OTHER PUBLICATIONS

Translation of DD278387 obtained Aug. 14, 2025.*

(Continued)

*Primary Examiner* — James Pilkington
(74) *Attorney, Agent, or Firm* — Stinson LLP

(57) ABSTRACT

A bearing unit (10) has radially outer and inner rings (31), (33), rolling bodies (32), a cage (34) containing the rolling bodies, and two sealing devices (35) arranged axially on opposite sides of the bearing unit (10) and interposed between the radially inner ring (33) and the radially outer ring (31). Each sealing device (35) is provided with first shield (40) and a second shield (50). The first shield (40) is sealed, axially inwards, against a support surface (31') of the radially outer ring (31) and is stably inserted in a first seat (**31*a*) of the radially outer ring (31). The second shield (50**)

(Continued)

Det. A is interference fitted on a radially outer surface (33*a*) of the radially inner ring (33) and axially outside the first shield (40). The first and second shields (40), (50) generate a tortuous path (P) therebetween to hinder the ingress of contaminants into the bearing unit (10).

29 Claims, 5 Drawing Sheets

(56) References Cited

U.S. PATENT DOCUMENTS

| | | | | |
|---|---|---|---|---|
| 6,102,575 | A * | 8/2000 | Obara | F16C 33/80<br>384/488 |
| 6,595,695 | B1 * | 7/2003 | Goto | F16C 33/7859<br>384/488 |
| 10,724,574 | B2 * | 7/2020 | Uchida | F16C 33/783 |
| 11,300,158 | B2 | 4/2022 | Baracca et al. | |
| 12,117,045 | B2 * | 10/2024 | Kawaguchi | F16C 33/7863 |
| 2004/0080113 | A1 * | 4/2004 | Linden | F16C 33/7879<br>277/412 |

FOREIGN PATENT DOCUMENTS

| | | | | |
|---|---|---|---|---|
| IT | 202000017509 | A1 | 1/2022 | |
| IT | 202000018031 | A1 | 1/2022 | |
| IT | 202100017093 | A1 | 12/2022 | |
| IT | 202100021353 | A1 | 2/2023 | |
| JP | 2001027252 | A | 1/2001 | |
| JP | 2003148497 | A * | 5/2003 | F16C 33/7859 |
| WO | WO-2021193419 | A1 * | 9/2021 | F16C 33/782 |

OTHER PUBLICATIONS

Examination Report of the National Intellectual Property Office of Italy in Application No. 102023000002274, dated Sep. 8, 2023; 15pgs.

* cited by examiner

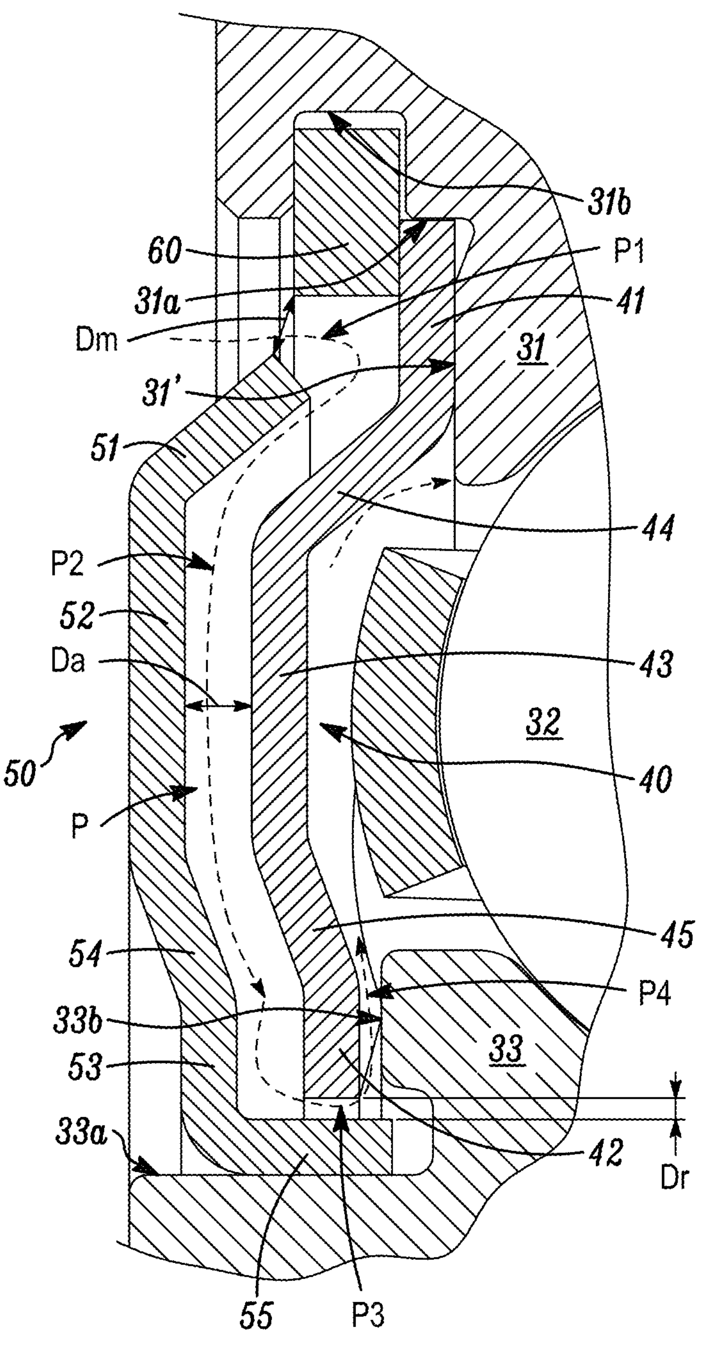
FIG. 3 - Det. A

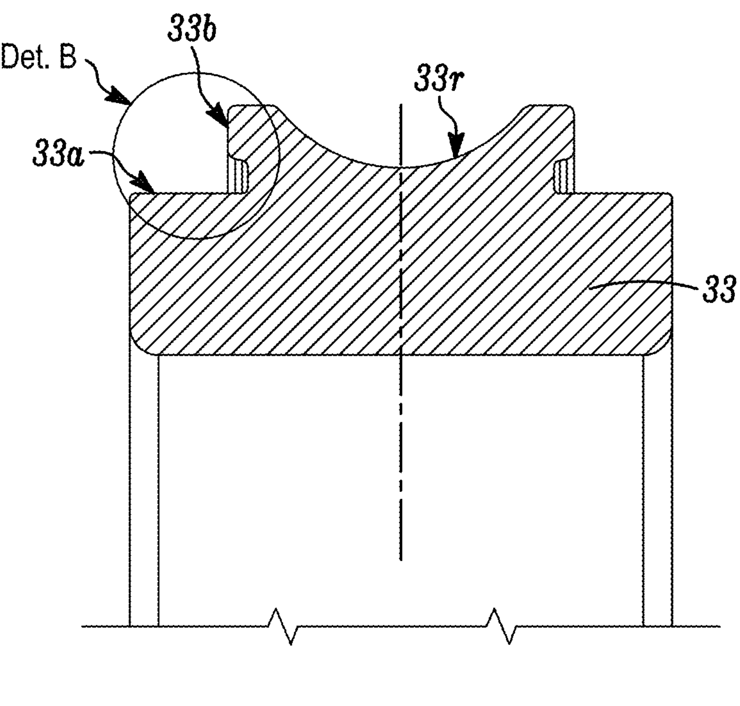
FIG. 4
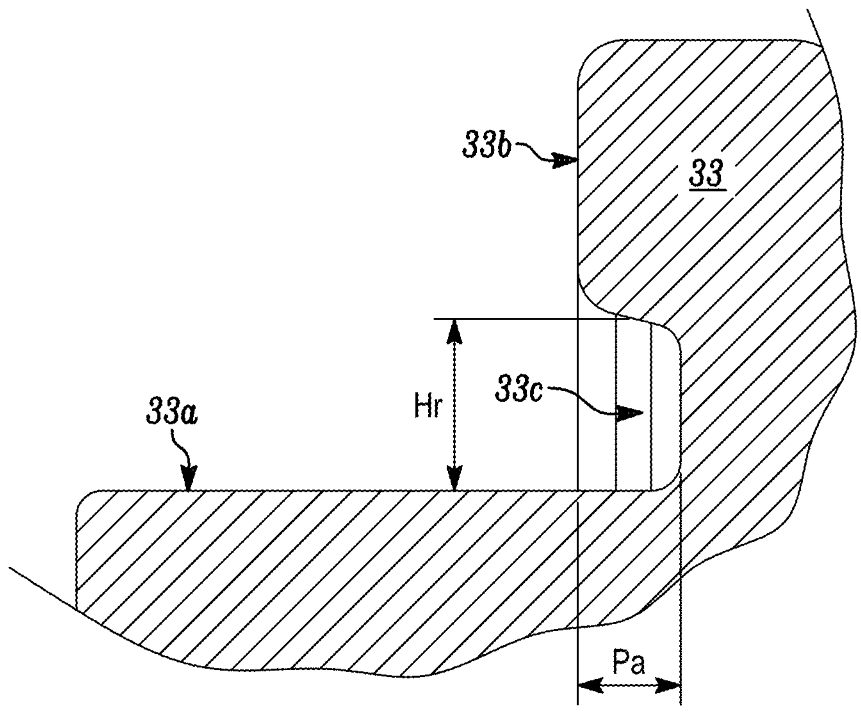
FIG. 5 - Det. B

BEARING UNIT

CROSS-REFERENCE TO RELATED APPLICATION

This application claims priority to Italian Application No. 102023000002274, filed Feb. 10, 2023, the entirety of which is hereby incorporated by reference.

FIELD

The present disclosure relates to a bearing unit. Said bearing unit is suitable for use in the manufacturing sector, in particular for use in the marble cutting sector.

BACKGROUND

In the manufacturing sector, and in particular in applications in the marble cutting sector, known bearing units have to have very limited axial dimensions as they are assembled axially side by side, and said size limit creates the need for technical solutions that are particularly sophisticated or even expensive in terms of the components used, which have to be high performance despite their small axial size.

In the context described above and with reference to FIG. 1, the bearing unit 1 usually has a first component, for example a radially outer ring 2, that is fastened to a rotary element, and a second component, for example a radially inner ring 3, that is fastened to a stationary element. As is known, it is often the case that the radially inner ring is rotary whereas the radially outer ring is stationary, although in other applications, such as that described, the outer ring rotates (in the marble sector, rotation speeds are typically around 750 rpm) while the inner ring is stationary. In any case, the rotation of one ring in relation to the other inside the roller bearing units is enabled by a plurality of rolling bodies 4 that are positioned between the cylindrical surface of one component and the cylindrical surface of the second component, normally referred to as raceways. The rolling bodies may be balls, cylindrical or conical rollers, needle rollers, and similar rolling bodies.

It is also known for bearing units to have sealing devices 5 to protect against external contaminants and to seal the lubricating grease. Typically, the sealing devices are made up of a shaped shield interference fitted in a seat in the rings of the bearing unit, for example the radially outer ring, and are made of metal or plastic, for example PTFE, or composite material. The shaped shield is designed to create an axial seal with the radially outer ring and a labyrinth seal with the radially inner ring.

This solution, which belongs to the applicant, has given satisfactory results. In any case, it should be noted that the sealing devices for these applications must be high performance, both in terms of function and in terms of reliability, throughout the service life of the bearing unit.

In this regard, for example, the sealing devices must not deteriorate over time and must always remain in their seat, otherwise their functionality is entirely lost.

In terms of functionality, it should be noted that the marble sector is a particularly demanding application for bearing units, with different types of contaminants in notable quantities, including water, marble dust (specifically a white calcium carbonate dust) and diamond dust from the marble cutting tools (typically diamond wires).

The sealing devices must therefore provide excellent functional performance. This task is made even more challenging because the aforementioned known bearing units are not only axially thin, but also have rather large diameters, which makes it even more technically complex to find solutions for the related sealing devices, which tend to wave and/or undulate and/or sag in relation to planes transverse to the axis of rotation by up to several centimetres as a result of these axial dimensions, further emphasizing the aforementioned problem of the large volume of contaminants.

SUMMARY

The present disclosure is therefore intended to provide a bearing unit that does not have the drawbacks described above. This objective is achieved by a novel component of the sealing device that helps to define a highly efficient labyrinth seal for the bearing units in marble cutting machines.

The present disclosure provides a bearing unit having the features set out in the attached claims.

BRIEF DESCRIPTION OF THE DRAWINGS

The present disclosure is described below with reference to the attached drawings, which show some non-limiting example embodiments of the bearing unit, in which:

FIG. 3 is a magnified sectional view of a detail of the bearing unit in FIG. 2.

FIG. 4 is a cross-sectional view of a component of the bearing unit in FIG. 2, and FIG. 5 is a magnified sectional view of a detail of the component in FIG. 4.

DETAILED DESCRIPTION

Figure 2:
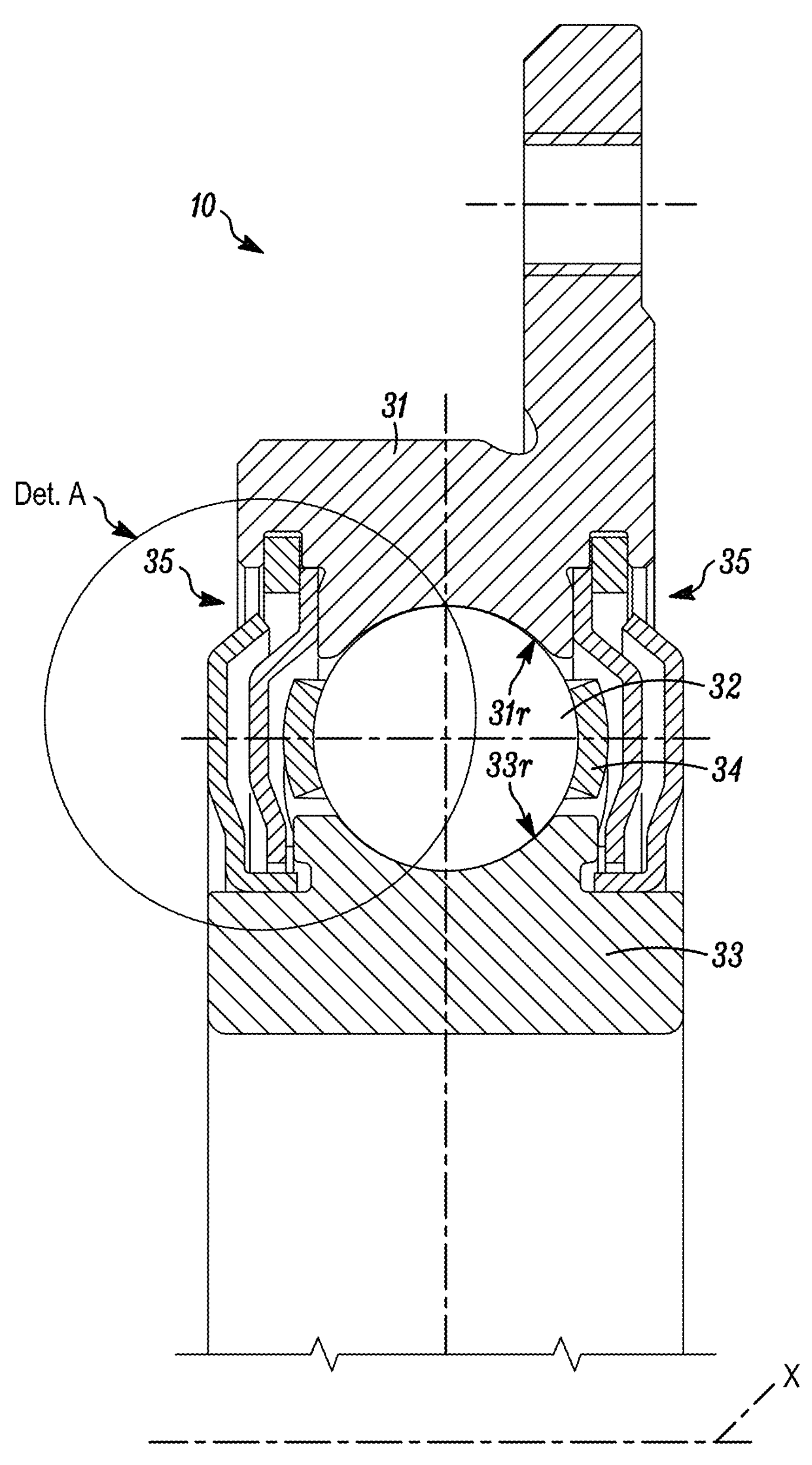
FIG. 2 is a cross-sectional view of a preferred embodiment of the bearing unit of the present disclosure.

In FIG. 2, reference sign 10 denotes a bearing unit as a whole for use in the marble cutting sector, and that comprises:

- a radially outer ring 31 that is rotary about a central axis of rotation X of the bearing unit 10, provided with a raceway 31*r*;
- a stationary radially inner ring 33 provided with a raceway 33*r*;
- a row of rolling bodies 32, in this example balls, interposed between the radially outer ring 31 and the radially inner ring 33 to enable relative rotation,
- a cage 34 for containing the rolling bodies to hold the rolling bodies of the row of rolling bodies 32 in position.

Throughout the present description and in the claims, terms and expressions indicating positions and orientations, such as “radial” and “axial”, should be understood with reference to the axis of rotation X of the bearing unit 10. “Radial” (e.g., radially) is understood as meaning a direction perpendicular to the axis of rotation X. For example, the terms “radially inner.” “radially internal,” and “radially inward” refer to a direction toward the axis of rotation X, and the terms “radially outer.” “radially outward.” and “radially external” refer to a direction away from the axis of rotation. “Axial” (e.g., axially) is understood as meaning a direction parallel to the axis of rotation X. For example, the terms "axially inner." "axially internal," and "axially inward(s)" refer to a direction toward rolling bodies 32 (more specifically, toward a plane of symmetry of the row of rolling bodies that is transverse to the axis of rotation) of the bearing unit 10, and the terms "axially outer" and "axially outside" refer to a direction away from the rolling bodies (more specifically, away from the plane of symmetry).

The bearing unit 10 is also provided with two sealing devices 35 arranged axially on opposite sides of the bearing unit 10, to seal said unit from the external environment.

With reference to FIG. 3, the sealing device 35 is interposed between the radially inner ring 33 and the radially outer ring 31 and comprises:

- a first shield 40 sealed, axially inwards, against a support surface 31' of the radially outer ring 31 and stably inserted in a first seat 31*a* of the radially outer ring 31, and
- a second shield 50 interference fitted on a radially outer surface 33*a* of the radially inner ring 33 and axially outside the first shield 40.

The first and second shields may be made of metal or composite material.

The first shield 40 is in turn provided with:

- a radially outer first flange portion 41 stably inserted in the first seat 31*a* of the radially outer ring 31,
- a radially inner second flange portion 42,
- an annular central portion 43,
- a frustoconical first connecting portion 44 connecting the first flange portion 41 to the central portion 43, and
- a frustoconical second connecting portion 45 connecting the second flange portion 42 to the central portion 43.

The first shield 40 therefore creates a radially outer axial seal between the first flange portion 41 and the support surface 31' of the radially outer ring 31.

The first shield 40 is held in a stable position in the first seat 31*a* by an anchoring element 60, which may be an elastic ring 60 made of metal, for example a Seeger ring, and is interference fitted in a second seat 31*b* of the radially outer ring 31, axially outside the first seat 31*a* to axially press the first shield 40, in particular the first flange portion 41 thereof, towards the surface 31' of the outer ring 31.

The second shield 50 is in turn provided with:

- a frustoconical, radially outer first flange portion 51, radially facing the anchoring element 60 and radially and axially facing the first connecting portion 44 of the first shield 40 on the outside,
- an annular central portion 52, axially facing the central portion 43 of the first shield 40 on the outside,
- a radially inner second flange portion 53, axially facing the second flange portion 42 of the first shield 40 on the outside,
- a frustoconical connecting portion 54 connecting the second flange portion 53 to the central portion 52 and axially facing the second connecting portion 45 of the first shield 40 on the outside, and
- a radially inner cylindrical portion 55 interference fitted on the radially outer surface 33*a* of the radially inner ring 33.

Figure 1:
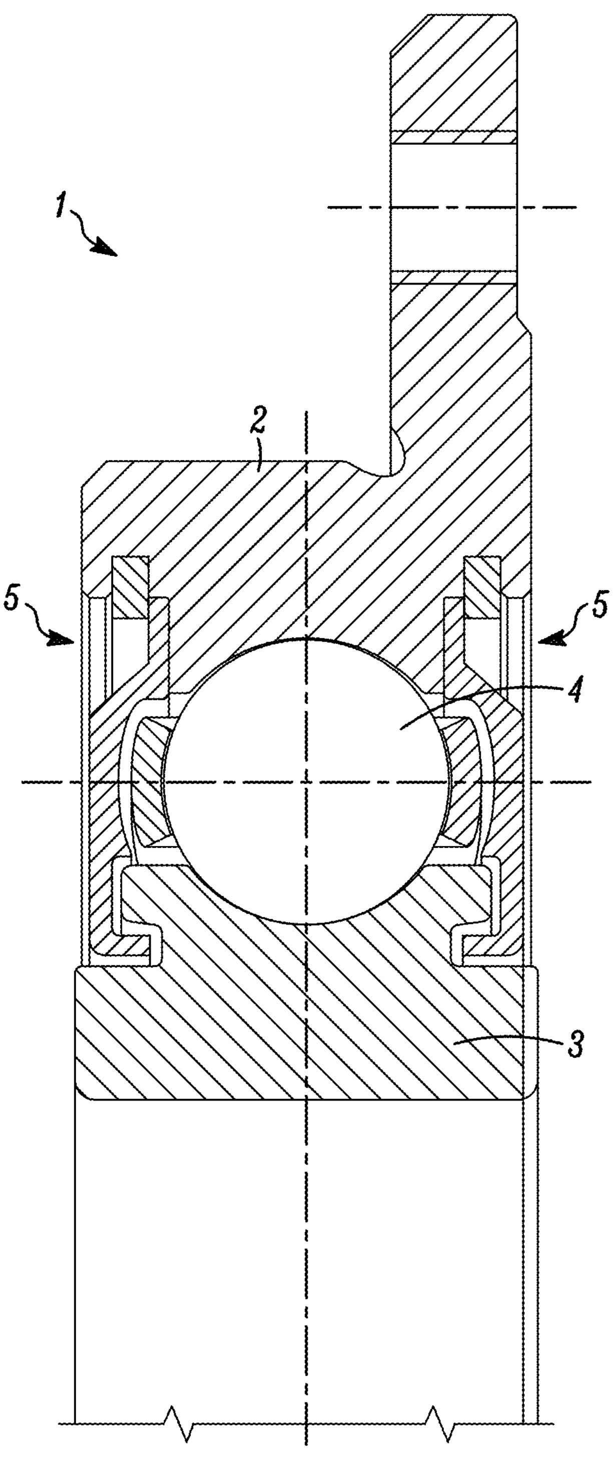
FIG. 1 is a cross-sectional view of a bearing unit according to the prior art.

To accommodate the second shield 50 such that it can be interference fitted on the radially inner ring 33, the latter has a toroidal recess 33*c*, the dimensions of which can be defined by a depth Pa in the axial direction and by a height Hr in the radial direction. Compared to other known solutions, for example the solution in FIG. 1, the axial depth does not need to be changed, whereas the radial height is slightly increased. In any case, the recess 33*c* is not at all problematic from a structural perspective, on the basis of practical experience with the known solution and considering the fact that the material removed to form the recess 33*c* is material that is not affected by the loads transmitted by the rolling bodies 32 to the raceway 33*r*.

Essentially, the second shield 50 creates a radially inner radial seal between the cylindrical portion 55 and the radially outer surface 33*a* of the radially inner ring 33.

Furthermore, according to the present disclosure, the second shield 50, which is designed to match practically the entire geometry of the first shield 40 and is shifted axially outwards therefrom, creates a labyrinth or a tortuous path P inside the first shield 40 and the second shield 50 that hinders the ingress of contaminants into the bearing unit.

In particular, following the direction of travel of any contaminant wedged in the tortuous path P (direction indicated in the figure by the arrows along the path P), some noteworthy stretches of said path can be highlighted:

- a first stretch P1 arranged radially between the anchoring element 60 and the first flange portion 51 of the second shield 50. It should be noted that, in addition to the narrow section created between these two components, the centrifugal effects caused by the relative rotation of the first shield 40 (rotary) relative to the second shield 50 (stationary) also further hinder the ingress of contaminants into the tortuous path P,
- a second stretch P2 axially interposed between the first shield 40 and the second shield 50,
- a third stretch P3 radially interposed between the second flange portion 42 of the first shield 40 and the cylindrical portion 55 of the second shield 50. In this stretch, the tolerances of the radial clearance between the components of the bearing unit, as explained in greater detail below, make it possible to define a very narrow section in this third stretch P3,
- a fourth stretch P4 axially interposed between the first shield 40 (in particular the second flange portion 42 thereof) and the radially inner ring 33 (in particular an axially outer surface 33*b* thereof).

This tortuous path P therefore becomes very long and defines a labyrinth that is particularly advantageous for preventing the ingress of contaminants into the bearing unit 10 as much as possible. The addition of the second shield 50 nearly triples the length of the labyrinth compared to other known solutions (for example the solution in FIG. 1). For a specific application, for example, the length of the labyrinth is increased from 5 mm (known solution in FIG. 1) to more than 15 mm in the present solution (FIGS. 2 and 3) with a percentage increase of more than 300%. This improves the protection of the bearing unit against contaminants, and consequently the service life of said bearing unit.

Furthermore, since neither the first shield 40 nor the second shield 50 have any sliding contact with one another or with other components of the bearing unit (the second shield 50 is stationary and is separated from both the first shield 40 and the anchoring element 60), the improved protection of the bearing unit against contaminants does not have any adverse effects in terms of friction losses.

In particular, the absence of any contact between the first shield 40 and the second shield 50 is ensured by providing an axial distance Da not less than 0.8 mm therebetween in the second stretch P2 of the tortuous path P. This distance ensures that there is no contact between the two shields, even under the worst axial-clearance conditions.

Another zone in which the two shields are prevented from coming into contact is the third stretch P3 of the tortuous path P. In this case, the minimum radial distance Dr between the second flange portion 42 of the first shield 40 and the cylindrical portion 55 of the second shield 50 may be equal to 0.3 mm. This value is much lower than the value of the axial distance Da since the radial clearance is ten times less than the axial clearance and the tolerances of the components during assembly (in particular the tolerances of the first shield 40) are very precise.

In the first stretch P1 of the tortuous path P, the minimum distance Dm between the anchoring element 60 and the first flange portion 51 of the second shield 50 is between 0.8 mm and 0.9 mm.

This minimum distance ensures that there is no contact between the anchoring element 60 and the second shield 50, and simultaneously increases the protection of the tortuous path P by creating a further narrow section at the entrance thereof.

Figure 3A:
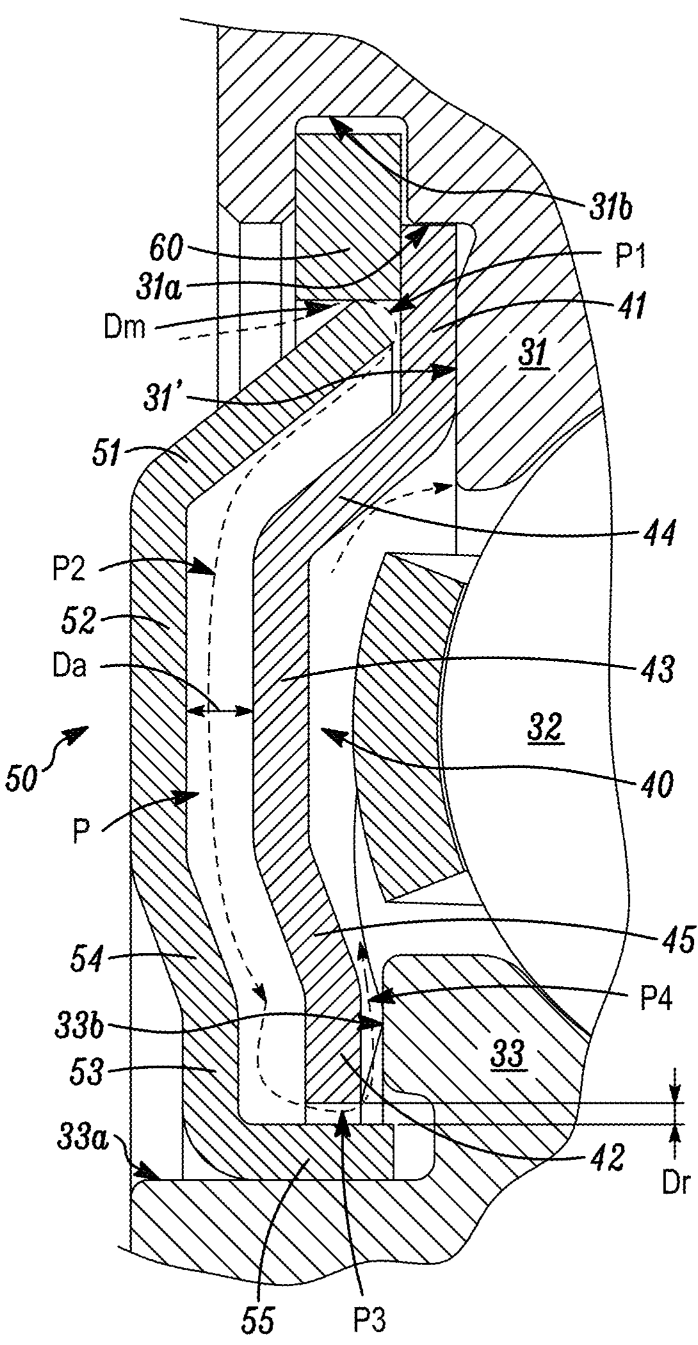
FIG. 3A is similar to FIG. 3 but illustrates an alternative embodiment of the bearing unit where a second shield and an anchoring element are in contact with one another.

Alternatively, with reference to FIG. 3A, by using a composite material for the second shield 50, it is possible to reduce this minimum distance Dm to zero by creating a small contact zone between the anchoring element 60 and the second shield 50. Consequently, in this embodiment, the second shield 50 can also be used to retain the anchoring element 60 in its seat 31*b*, to prevent disassembly of the anchoring element 60. This is an important function since the functionality of the first shield 40, and consequently the reliability of the bearing unit as a whole, would be adversely affected if the anchoring element came out of its seat. On the other hand, contact between the two components would not create any problems if at least one component is made of composite material. There may be a small amount of wear on the second shield 50 (composite material is obviously less hard than metal), which would reduce local contact between the two components to zero. This would not however affect the function of preventing the anchoring element 60 from accidentally coming out of its seat.

In any case, in addition to having a narrow section of distance Dm, the ingress of external contaminants into the tortuous path P is further hindered by the frustoconical shape of the first flange portion 51 of the second shield 50, which acts as a deflector, preventing contaminants from entering the tortuous path P. Indeed, in applications in the marble sector, the bearing units in machines for cutting marble are assembled closely together, in a number of the order of 80 to 100 bearing units. In particular, the radially inner rings (stationary) are butted against one another, whereas there is a small amount of clearance between the mutually adjacent radially outer rings (rotary). Since external contaminants can only enter through the space between two adjacent outer rings, the frustoconical shape of the first flange portion 51 of the second shield 50 in cooperation with the same mirrored shape of the adjacent shield creates a sort of convergent channel that conveys the contaminants towards the inner ring and in any case away from the tortuous path P.

Having regard to the fourth stretch P4 of the tortuous path P, the axial distance between the second flange portion 42 of the first shield 40 and the surface 33*b* of the radially inner ring 33 is approximately 0.4 mm, this value already being in use in other known solutions and being known to provide a narrow section in the stretch P4 with no risk of contact between the two components involved, even under unfavourable clearance and tolerance conditions.

The first shield 40 has the shape described above (a central portion 43 and two connecting portions 44, 45) to match the profile of the containment cage 34 axially towards the outside. This feature enables optimization of the space in the axial direction to accommodate the second shield 50 without adversely affecting the axial size of the bearing unit as a whole. Furthermore, the frustoconical portions 44, 45 increase the rigidity of the first shield 40 so as to minimize any bending of the first shield 40 that could occur in the most demanding applications.

The adopted solution does not have any drawbacks, including any related to the disassembly and reassembly of the bearing unit 10 by an end user. Indeed, the second shield 50 is assembled with an interference of between 0.05 mm and 0.15 mm. This is therefore a very low interference that enables easy disassembly and reassembly by the end user. Furthermore, the use of an anchoring element 60, for example a Seeger ring, has the advantage of enabling the independent disassembly of the Seeger ring and of the first shield 40, insertion of new lubricant into the bearing unit 10, and subsequent reassembly.

Returning to the second shield 50, the assembly interference can be low because, in marble working applications, the radially inner ring is stationary and the radially outer ring is rotary. As already seen, this means that the second shield 50 is a stationary component that is not in contact with other components. Given that the contaminants in this specific application are water and dust, it is not necessary for the second shield 50 to have specific hardness and mechanical strength features. Furthermore, excessively high interference would make it difficult to disassemble the second shield without permanently deforming the structure thereof.

In short, the sealing device according to the present disclosure improves the protection of the bearing unit against external contaminants, and consequently the service life of said bearing unit, without creating drawbacks in terms of friction losses or the possibility of simple disassembly and reassembly of the bearing unit.

Numerous other variants exist in addition to the embodiments of the present disclosure described above. These embodiments should also be understood to be examples and do not limit the scope, applications or possible configurations of the present disclosure. Indeed, although the description provided above enables the person skilled in the art to carry out the present disclosure at least according to one example configuration thereof, numerous variations of the components described could be used without thereby departing from the scope of the present disclosure, as defined in the attached claims interpreted literally and/or according to their legal equivalents.

What is claimed is:

1. A bearing unit comprising:

a radially outer ring, rotatable with respect to an axis of rotation;

a stationary radially inner ring;

a row of rolling bodies interposed between the radially outer ring and the radially inner ring;

a cage for containing the rolling bodies; and two sealing devices arranged axially on opposite sides of the bearing unit and interposed between the radially inner ring and the radially outer ring, each sealing device comprising:

an anchoring element interference fitted in a second seat of the radially outer ring;

a first shield sealed against a support surface of the radially outer ring and disposed in a first seat of the radially outer ring, the first shield being spaced apart from the radially inner ring, the first shield being kept in the first seat by the anchoring element, the anchoring element being axially outside the first seat, the first shield comprising:

a radially outer first flange portion disposed in the first seat of the radially outer ring;

a radially inner second flange portion;

an annular central portion;

a frustoconical first connecting portion connecting the first flange portion to the central portion; and a frustoconical second connecting portion connecting the second flange portion to the central portion; and a second shield interference fitted on a radially outer surface of the radially inner ring and axially outside the first shield, the second shield comprising:

a frustoconical, radially outer first flange portion, radially facing the anchoring element and radially and axially facing the first connecting portion of the first shield, an annular central portion, axially facing the central portion of the first shield, a radially inner second flange portion, axially facing the second flange portion of the first shield, a frustoconical connecting portion connecting the second flange portion to the central portion and axially facing the second connecting portion of the first shield, and a radially inner cylindrical portion interference fitted on the radially outer surface of the radially inner ring;

wherein the first shield and the second shield generate a tortuous path therebetween which hinders the ingress of contaminants into the bearing unit.

2. The bearing unit according to claim 1, wherein the radially inner ring has a toroidal recess for accommodating the second shield.

3. The bearing unit according to claim 2, wherein the tortuous path has:

a first stretch arranged radially between the anchoring element and the first flange portion of the second shield;

a second stretch axially interposed between the first shield and the second shield;

a third stretch radially interposed between the second flange portion of the first shield and the cylindrical portion of the second shield; and a fourth stretch axially interposed between the first shield and the radially inner ring.

4. The bearing unit according to claim 3, wherein, in the second stretch of the tortuous path, an axial distance between the first shield and second shield is not less than 0.8 mm.

5. The bearing unit according to claim 3, wherein, in the third stretch of the tortuous path, a minimum radial distance between the second flange portion of the first shield and the cylindrical portion of the second shield is equal to 0.3 mm.

6. The bearing unit according to claim 3, wherein, in the first stretch of the tortuous path, a minimum distance between the anchoring element and the first flange portion of the second shield is between 0.8 mm and 0.9 mm.

7. The bearing unit according to claim 3, wherein the second shield is made of composite material and is in contact with the anchoring element.

8. The bearing unit according to claim 1, wherein a portion of the second shield is radially inward of the first shield.

9. The bearing unit according to claim 8, wherein the portion of the second shield that is radially inward of the first shield is the radially inner cylindrical portion of the second shield.

10. The bearing unit according to claim 1, wherein the tortuous path has:

a first stretch arranged radially between the anchoring element and the first flange portion of the second shield;

a second stretch axially interposed between the first shield and the second shield;

a third stretch radially interposed between the second flange portion of the first shield and the cylindrical portion of the second shield; and a fourth stretch axially interposed between the first shield and the radially inner ring.

11. The bearing unit according to claim 10, wherein, in the second stretch of the tortuous path, an axial distance between the first shield and second shield is not less than 0.8 mm.

12. The bearing unit according to claim 10, wherein, in the third stretch of the tortuous path, a minimum radial distance between the second flange portion of the first shield and the cylindrical portion of the second shield is equal to 0.3 mm.

13. The bearing unit according to claim 10, wherein, in the first stretch of the tortuous path, a minimum distance between the anchoring element and the first flange portion of the second shield is between 0.8 mm and 0.9 mm.

14. The bearing unit according to claim 10, wherein the second shield is made of composite material and is in contact with the anchoring element.

15. The bearing unit according to claim 1, wherein a portion of the second shield is radially between a radially inner-most surface of the first shield and the axis of rotation.

16. The bearing unit according to claim 15, wherein the portion of the second shield that is between the radially inner-most surface of the first shield and the axis of rotation is the radially inner cylindrical portion of the second shield.

17. The bearing unit according to claim 1, wherein the first shield is made of metal.

18. The bearing unit according to claim 17, wherein the second shield is made of metal.

19. The bearing unit according to claim 1, wherein the second shield radially underlies the first shield.

20. A bearing unit comprising:

a radially outer ring, rotatable with respect to an axis of rotation;

a stationary radially inner ring;

a row of rolling bodies interposed between the radially outer ring and the radially inner ring;

a cage for containing the rolling bodies; and two sealing devices arranged axially on opposite sides of the bearing unit and interposed between the radially inner ring and the radially outer ring, each sealing device comprising:

a first shield sealed against a support surface of the radially outer ring and disposed in a first seat of the radially outer ring, the first shield being spaced apart from the radially inner ring, the first shield comprising a frustoconical portion;

a second shield interference fitted on a radially outer surface of the radially inner ring and axially outside the first shield, the second shield comprising a frustoconical, radially outer flange portion radially and axially facing the frustoconical portion of the first shield; and an anchoring element interference fitted in a second seat of the radially outer ring, axially outside the first seat, wherein the first shield is kept in the first seat by the anchoring element;

wherein the first shield and the second shield generate a tortuous path therebetween which hinders the ingress of contaminants into the bearing unit.

21. The bearing unit according to claim 20, wherein the frustoconical, radially outer flange portion of the second shield radially faces the anchoring element.

22. The bearing unit according to claim 20, wherein the radially inner ring has a toroidal recess for accommodating the second shield.

23. The bearing unit according to claim 20, wherein the first shield is made of metal.

24. The bearing unit according to claim 20, wherein the second shield is made of metal.

25. The bearing unit according to claim 21, wherein the second shield is made of composite material and is in contact with the anchoring element.

26. The bearing unit according to claim 20, wherein the first shield comprises a radially inner flange portion, and wherein the second shield comprises a radially inner flange portion, axially facing the flange portion of the first shield.

27. The bearing unit according to claim 20, wherein the second shield radially underlies the first shield.

28. The bearing unit according to claim 9, wherein a portion of the second shield is radially inward of the first shield.

29. The bearing unit according to claim 9, wherein a portion of the second shield is radially between a radially inner-most surface of the first shield and the axis of rotation.

* * * * *